United States Patent
Funato et al.

(10) Patent No.: US 8,373,736 B2
(45) Date of Patent: Feb. 12, 2013

(54) OPTICAL SCANNING DEVICE AND IMAGE FORMING APPARATUS

(75) Inventors: Hiroyoshi Funato, Kanagawa (JP);
Kazunori Bannai, Kanagawa (JP);
Daisuke Imaki, Kanagawa (JP);
Yoshinori Hayashi, Kanagawa (JP);
Makoto Hirakawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 612 days.

(21) Appl. No.: 12/534,896

(22) Filed: Aug. 4, 2009

(65) Prior Publication Data
US 2010/0034563 A1 Feb. 11, 2010

(30) Foreign Application Priority Data
Aug. 6, 2008 (JP) ................... 2008-202498
Jul. 10, 2009 (JP) ................... 2009-163250

(51) Int. Cl.
*B41J 15/14* (2006.01)
*B41J 27/00* (2006.01)

(52) U.S. Cl. ..................... 347/244; 347/258

(58) Field of Classification Search .............. 347/231, 347/242–244, 256–261; 359/487.01, 487.04, 359/489.07, 489.08
See application file for complete search history.

(56) References Cited

U.S. PATENT DOCUMENTS

| | | | |
|---|---|---|---|
| 5,031,978 A | 7/1991 | Shibaguchi et al. | |
| 5,119,452 A | 6/1992 | Yokomori et al. | |
| 5,124,835 A | 6/1992 | Shibaguchi et al. | |
| 5,175,642 A | 12/1992 | Funato | |
| 5,208,800 A | 5/1993 | Isobe et al. | |
| 5,233,457 A * | 8/1993 | Hamada et al. | 359/216.1 |
| 5,426,298 A | 6/1995 | Sakuma et al. | |
| 5,504,619 A * | 4/1996 | Okazaki | 359/489.07 |
| 6,072,579 A | 6/2000 | Funato | |
| 6,456,315 B1 * | 9/2002 | Shinada | 347/256 |
| 6,636,349 B2 * | 10/2003 | Takahashi et al. | 359/351 |
| 6,697,092 B2 | 2/2004 | Bannai | |
| 6,786,590 B2 | 9/2004 | Maki et al. | |
| 6,891,559 B1 | 5/2005 | Bannai | |
| 7,088,382 B2 * | 8/2006 | Kim | 347/234 |
| 7,215,349 B2 | 5/2007 | Sakaue et al. | |
| 7,436,425 B2 | 10/2008 | Yamazaki et al. | |
| 7,450,146 B2 | 11/2008 | Sakaue et al. | |
| 7,705,872 B2 * | 4/2010 | Higaki et al. | 347/243 |
| 2004/0100550 A1 | 5/2004 | Bannai et al. | |
| 2004/0213133 A1 | 10/2004 | Funato et al. | |
| 2007/0064087 A1 | 3/2007 | Matsumae et al. | |

(Continued)

FOREIGN PATENT DOCUMENTS

| | | | |
|---|---|---|---|
| JP | 06059210 A | * | 3/1994 |
| JP | 7-113970 | | 5/1995 |
| JP | 10-3048 | | 1/1998 |
| JP | 3214944 | | 7/2001 |
| JP | 2007-225680 | | 9/2007 |

*Primary Examiner* — Hai C Pham
(74) *Attorney, Agent, or Firm* — Dickstein Shapiro LLP

(57) ABSTRACT

P-polarized light beam passing through an fθ lens passes through a polarization beam splitter, is converted into S-polarized light beam by a quarter-wave plate and a reflecting mirror, re-enters the polarization beam splitter, and is reflected at the polarization beam splitter in the −Z direction. An optical path of a light beam between a polygon mirror and the fθ lens, between the fθ lens and the polarization beam splitter, between the polarization beam splitter and the quarter-wave plate, between the quarter-wave plate and a reflecting mirror, between the reflecting mirror and the quarter-wave plate, and between the quarter-wave plate and the polarization beam splitter are in the same plane.

14 Claims, 13 Drawing Sheets

U.S. PATENT DOCUMENTS

| | | |
|---|---|---|
| 2007/0188589 A1 | 8/2007 | Kusunose et al. |
| 2008/0024851 A1 | 1/2008 | Sakaue et al. |
| 2009/0058981 A1 | 3/2009 | Higaki et al. |
| 2009/0066780 A1 | 3/2009 | Bannai et al. |

* cited by examiner

FIG. 22

|  | SURFACE A | SURFACE B |
|---|---|---|
| $R_y$ | 359.218 | −415.046 |
| K | $-1.188 \times 10^{-2}$ | 3.023 |
| $A_4$ | $5.816 \times 10^{-7}$ | $3.780 \times 10^{-7}$ |
| $A_6$ | $-1.631 \times 10^{-10}$ | $-9.968 \times 10^{-11}$ |
| $A_8$ | $3.456 \times 10^{-14}$ | $2.662 \times 10^{-14}$ |
| $A_{10}$ | $-4.429 \times 10^{-18}$ | $-5.402 \times 10^{-18}$ |
| $A_{12}$ | $5.898 \times 10^{-23}$ | $3.520 \times 10^{-22}$ |
| $A_{14}$ | $-1.114 \times 10^{-27}$ | $-1.035 \times 10^{-26}$ |
| $R_z$ | 80.749 | −83.436 |
| $B_1$ | — | $-4.553 \times 10^{-6}$ |
| $B_2$ | $-2.109 \times 10^{-6}$ | $1.950 \times 10^{-6}$ |
| $B_3$ | — | $2.063 \times 10^{-11}$ |
| $B_4$ | $5.159 \times 10^{-10}$ | $-2.522 \times 10^{-10}$ |
| $B_5$ | — | $3.094 \times 10^{-13}$ |
| $B_6$ | $-1.217 \times 10^{-13}$ | $-1.044 \times 10^{-14}$ |
| $B_7$ | — | $-5.156 \times 10^{-17}$ |
| $B_8$ | — | $-4.042 \times 10^{-18}$ |

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2008-202498 filed in Japan on Aug. 6, 2008 and Japanese Patent Application No. 2009-163250 filed in Japan on Jul. 10, 2009.

BACKGROUND OF THE INVENTION

1. Field of the Invention

The present invention relates to optical scanning devices for use in image forming apparatuses.

2. Description of the Related Art

Image forming apparatuses that perform electrophotographic image recording by using lasers are widely used. Such an image forming apparatus generally includes an optical scanning device that outputs a laser beam and optically scans a surface of a rotating photosensitive drum in an axial direction with the laser beam so as to form a latent image on the photosensitive drum. The laser beam output from the optical scanning device is typically deflected by a deflector toward the photosensitive drum.

For example, Japanese Patent Application Laid-open No. H10-3048 discloses an optical scanning device for use in a multi-color image forming apparatus. The optical scanning device includes a light emitting unit, a deflection scanning unit, an image forming unit, a polarization splitting unit, and a deflecting unit. The light emitting unit emits a superimposed laser beam in which two laser beams with polarization directions differing by 90 degrees are superimposed. The deflection scanning unit performs deflection scanning in which the superimposed laser beam emitted from the light emitting unit is deflected and scanned. The image forming unit focuses the superimposed laser beam that is subjected to the deflection scanning by the deflection scanning unit. The polarization splitting unit splits the superimposed laser beam into two laser beams by making the superimposed laser beam to be reflected and transmitted. One of the laser beams, i.e. the reflected laser beam, is directed to the surface of a first photosensitive drum, and the other one of the laser beams, i.e., the laser beam passing through the polarization splitting unit, is directed toward the surface of a second photosensitive drum.

Japanese Patent Application Laid-open No. 2007-225680 discloses a scanning optical device and a color image forming apparatus that includes four photosensitive elements. The scanning optical device includes four semiconductor lasers, two rotating polygon mirrors, and four sets of scanning lenses.

Japanese Patent No. 3214944 discloses an optical scanning device. The optical scanning device is configured such that, a light beam emitted from a light source is deflected by a deflecting unit, passes through a half mirror that is inclined with respect to a plane of the deflected laser beam, and enters a reflective image forming element. The light beam reflected by the reflective image forming element is reflected by the half mirror and focused on a target surface as a light spot. In this manner, a reflective image forming element employed to perform image formation.

In recent years, there have been increasing demands for a thinner image forming apparatus. However, in the optical scanning device disclosed in Japanese Patent Application Laid-open No. H10-3048, a deflection surface at, the deflection scanning unit is not parallel to a surface including an irradiation position of each of the photosensitive drum, whereby the image forming apparatus including the optical scanning device becomes large.

In the color image forming apparatus disclosed in Japanese Patent Application Laid-open No. 2007-225680, to obtain an optical path length corresponding to a length of the main-scanning direction, a certain distance needs to be secured between the rotating polygon mirror and the photosensitive drum, which causes a gap between the scanning optical device and the photosensitive drum to become large. The gap between the scanning optical device and the photosensitive drum could be narrowed by employing a plurality of reflecting mirrors; however, in that case the scanning optical device becomes large in the thickness direction in such a case.

In the optical scanning device disclosed in Japanese Patent No. 3214944, because the intensity of the laser beam irradiating the target surface decreases to ¼ when the laser beam passes through the half mirror or is reflected by the half mirror, a high-power light source is required, which increases manufacturing costs.

SUMMARY OF THE INVENTION

It is an object of the present invention to at least partially solve the problems in the conventional technology.

According to an aspect of the present invention, there is provided an optical scanning device that scans a target surface with a light beam. The scanning device includes a light source unit that outputs a light beam; a deflector that receives the light beam from the light source unit and deflects the light beam; and a scanning optical system that focuses the light beam deflected by the deflector on the target surface. The scanning optical system includes a polarization splitting element and a conversion optical system. The polarization splitting element receives the light beam from the deflector and, if the light beam is polarized in a first-polarization direction, transmits the light beam. The conversion optical system is arranged in an optical path of the light beam passing through the polarization splitting element, receives the light beam from the polarization splitting element, converts the polarization direction of the light beam from the first-polarization direction into a second-polarization direction that is different from the first-polarization direction, and outputs the light beam that is polarized in the second-polarization direction toward the polarization splitting element, and the polarization splitting element receives the light beam that is polarized in the second-polarization direction from the conversion optical system and deflects the optical path of the light beam that is polarized in the second-polarization direction into a direction toward the target surface.

According to another aspect of the present invention, there is provided an image forming apparatus that includes at least one image carrier; and an optical scanning device configured to scan a surface of the image carrier with a light beam containing image information. The optical scanning device includes a light source unit that outputs a light beam; a deflector that receives the light beam from the light source unit and deflects the light beam; and a scanning optical system that focuses the light beam deflected by the deflector on the target surface. The scanning optical system includes a polarization splitting element and a conversion optical system. The polarization splitting element receives the light beam from the deflector and, if the light beam is polarized in a first-polarization direction, transmits the light beam. The conversion optical system is arranged in an optical path of the light beam passing through the polarization splitting element, receives the light beam from the polarization splitting element, converts the polarization direction of the light beam from the first-polarization direction into a second-polarization direction that is different from the first-polarization direction, and outputs the light beam that is polarized in the second-polarization direction toward the polarization splitting element, and the polarization splitting element receives the light beam that is polarized in the second-polarization direction from the conversion optical system and deflects the optical path of the light beam that is polarized in the second-polarization direction into a direction toward the target surface.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 22 is a table for explaining a shape of both faces (face A and face B) of a scanning lens arranged in the scanning optical system.

DETAILED DESCRIPTION OF THE PREFERRED EMBODIMENTS

Exemplary embodiments of the present invention are described in detail below with reference to the accompanying drawings.

Figure 1:
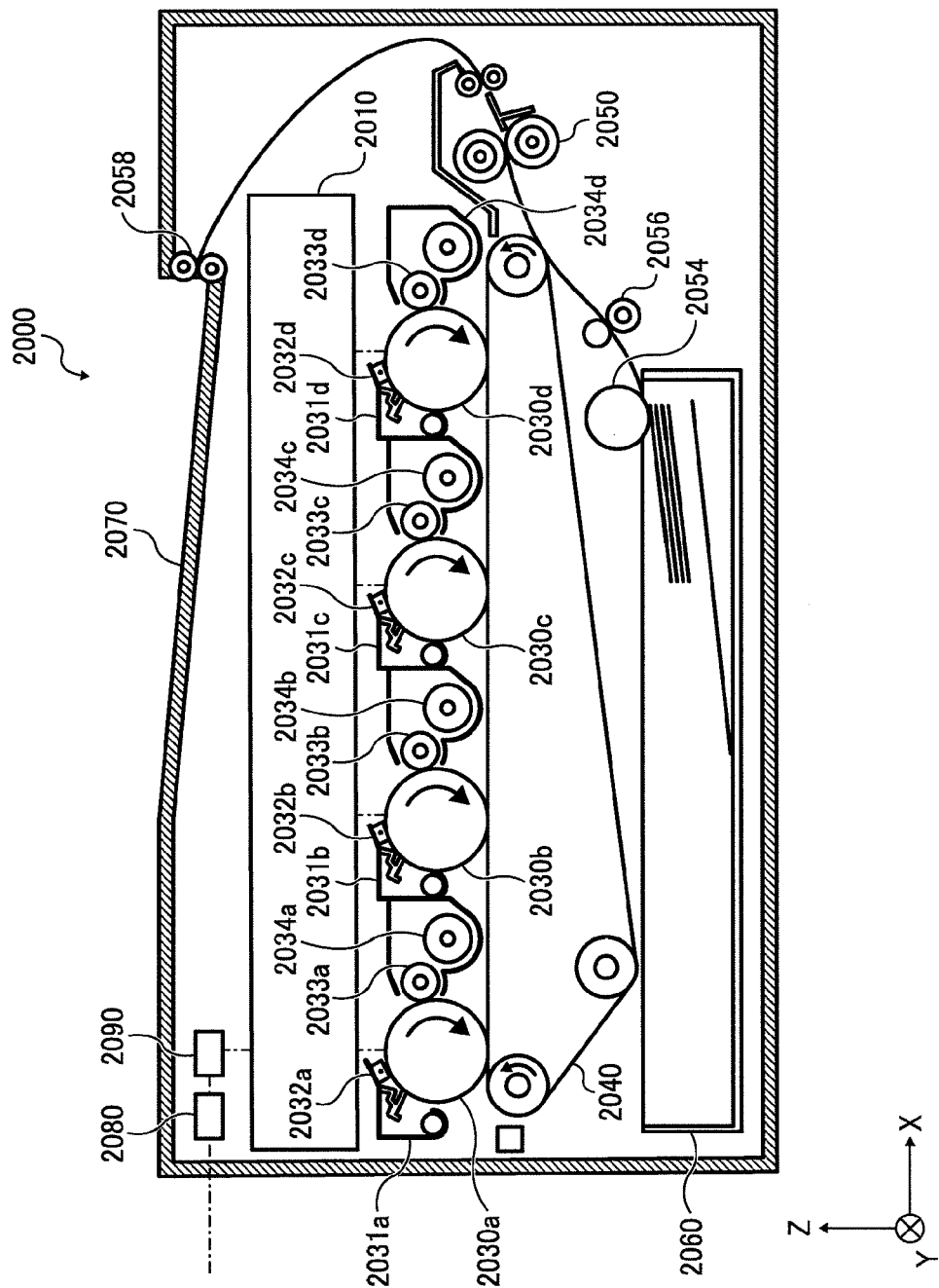
FIG. 1 is a side view of an internal configuration of a color printer according to an embodiment of the present invention.

FIG. 1 is a side view of an internal configuration of a color printer 2000 according to an embodiment of the present invention. The color printer 2000 is a tandem type multi-color printer that forms a full-color image by superimposing four colors (black, cyan, magenta, and yellow). The color printer 2000 includes an optical scanning device 2010, four photosensitive elements (2030a, 2030b, 2030c, and 2030d), four cleaning units (2031a, 2031b, 2031c, and 2031d), four electric chargers (2032a, 2032b, 2032c, and 2032d), four developing rollers (2033a, 2033b, 2033c, and 2033d), four toner cartridges (2034a, 2034b, 2034c, and 2034d), a transfer belt 2040, a pair of fusing rollers 2050, a feeding roller 2054, a pair of registration rollers 2056, a pair of discharging rollers 2058, a feed tray 2060, a receiving tray 2070, a communication control device 2080, and a printer control device 2090 that controls all the components described above.

The communication control device 2080 controls a two-way communication with a higher-level device, for example a personal computer, via a network.

The photosensitive element 2030a, the electric charger 2032a, the developing roller 2033a, the toner cartridge 2034a, and the cleaning unit 2031a are used as a unit and constitute an image station (hereinafter, "K station") that forms a black image.

The photosensitive element 2030b, the electric charger 2032b, the developing roller 2033b, the toner cartridge 2034b, and the cleaning unit 2031b are used as a unit and constitute an image station (hereinafter, "C station") that forms a cyan image.

The photosensitive element 2030c, the electric charger 2032c, the developing roller 2033c, the toner cartridge 2034c, and the cleaning unit 2031c are used as a unit and constitute an image station (hereinafter, "M station") that forms a magenta image.

The photosensitive element 2030d, the electric charger 2032d, the developing roller 2033d, the toner cartridge 2034d, and the cleaning unit 2031d are used as a unit and constitute an image station (hereinafter, "Y station") that forms a yellow image.

The photosensitive element has a photosensitive layer on its surface. The surface of the photosensitive element is the target of optical scanning. The photosensitive element is rotated by the action of a rotation mechanism (not shown) in the direction indicated by an arrow in FIG. 1. In this specification, the direction parallel to the axis of rotation of the photosensitive elements represents the Y-axis direction and the direction in which the four photosensitive elements are arranged represents the X-axis direction of the XYZ three-dimensional orthogonal coordinate system.

The electric charger 2032 uniformly charges the surface of a corresponding one of the photosensitive element.

The optical scanning device 2010 irradiates an appropriate portion of the surface of each charged photosensitive element 2030 (i.e., 2030a, 2030b, 2030c, and 2030d) with a light beam modulated for each corresponding color based on multi-color image information (black image information, cyan image information, magenta image information, and yellow image information) received from the higher-level device. Accordingly, only the portion of the surface of each photosensitive element 2030 that is irradiated with the light is decharged. By this process, a latent image corresponding to the image information is formed on the surface of each of the photosensitive elements 2030. The latent image is conveyed toward the corresponding developing roller 2033 along with the rotation of the photosensitive element 2030. The configuration of the optical scanning device 2010 is described later.

The toner cartridge 2034a stores therein a black toner that is supplied to the developing roller 2033a. The toner cartridge 2034b stores therein a cyan toner that is supplied to the developing roller 2033b. The toner cartridge 2034c stores therein a magenta toner that is supplied to the developing roller 2033c. The toner cartridge 2034d stores therein a yellow toner that is supplied to the developing roller 2033d.

The toner from the corresponding toner cartridge 2034 is applied, with the rotation of each developing roller 2033, onto the surface of the developing roller 2033 in a thin, uniform manner. When the toner on the surface of each developing roller 2033 comes into contact with the surface of the corresponding photosensitive element 2030, the toner is transferred only to the portion on the surface irradiated with the light and adheres to that portion. In other words, the toner is adhered on the latent image formed on the surface of the corresponding photosensitive element 2030 by each of the developing rollers 2033 thereby converting the latent image to a visible image (hereinafter, "toner image"). The toner image is conveyed toward the transfer belt 2040 with the rotation of the photosensitive element 2030.

The yellow, magenta, cyan, and black toner images are sequentially transferred and in a superimposed manner onto the transfer belt 2040 at a predetermined timing thereby forming a full-color image on the transfer belt 2040.

The feed tray 206b stores therein sheets of recording paper. The feeding roller 2054 is arranged near the feed tray 2060. The feeding roller 2054 picks up the recording paper one by one from the feed tray 2060 and conveys the recording paper to a nip between the registration rollers 2056. The registration rollers 2056 convey the recording paper toward the transfer belt 2040 at a predetermined timing. Accordingly, the color image on the transfer belt 2040 is transferred onto the recording paper. The recording paper onto which the image is transferred is conveyed to a nip between the fusing rollers 2050.

The fusing rollers 2050 apply heat and pressure to the recording paper whereby toner of the toner image on the recording paper is fused to the recording paper. The recording paper with the fused toner image is conveyed to the receiving tray 2070 via the discharging rollers 2058 and stacked up on the receiving tray 2070 one by one.

The cleaning unit 2031 cleans (removes or scraps) toner (residual toner) remaining on the surface of a corresponding one of the photosensitive element 2030. The clean surface of the photosensitive element 2030 returns to the position opposing to the corresponding electric charger.

Figure 2:
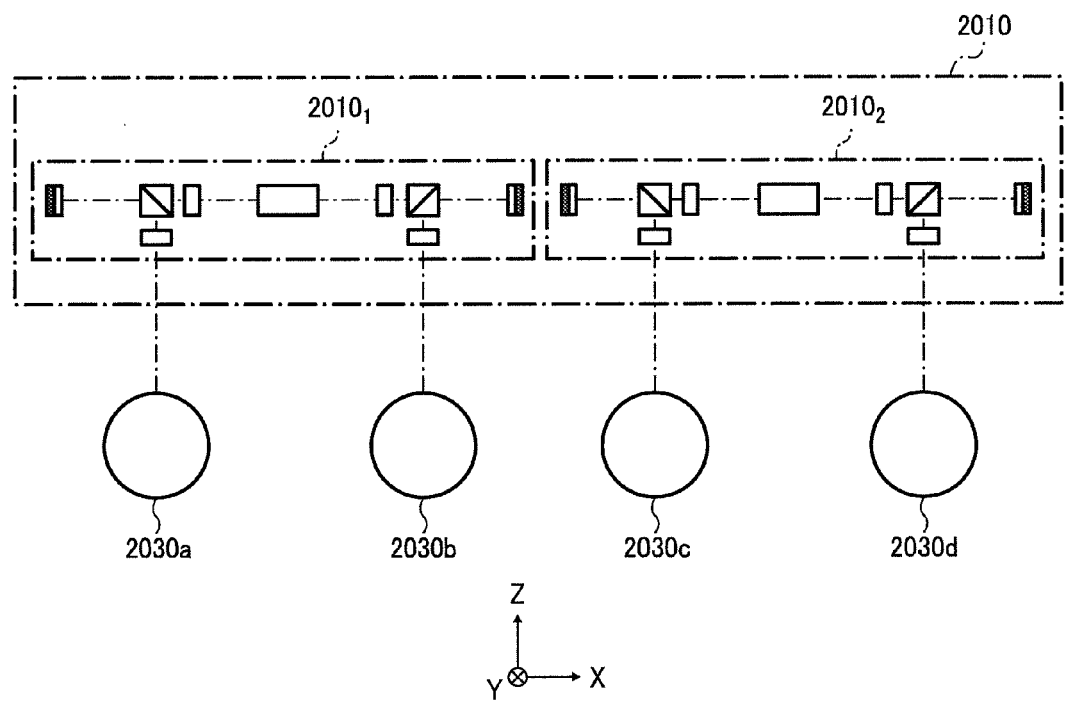
FIGS. 2 and 3 are schematic diagrams of an exemplary configuration of an optical scanning device illustrated in FIG. 1.
Figure 3:
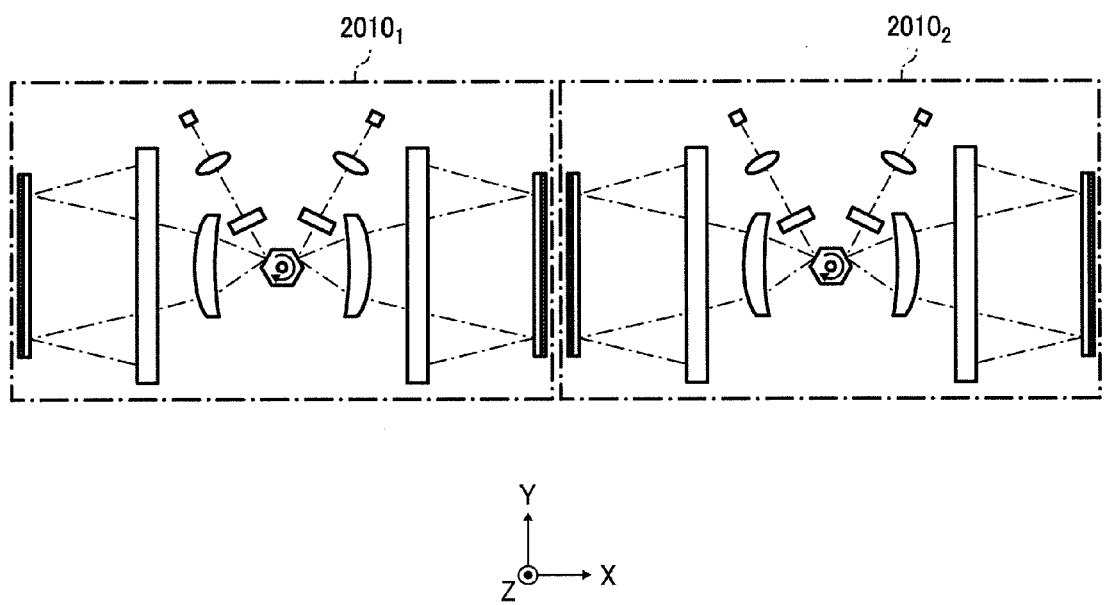

The configuration of the optical scanning device 2010 is described next. As shown in FIGS. 2 and 3, the optical scanning device 2010 includes two optical scanning units (a first optical scanning unit $2010_1$ and a second optical scanning unit $2010_2$), and a scanning control device (not shown) that controls the optical scanning units $2010_1$ and $2010_2$. The first optical scanning unit $2010_1$ *is employed to optically scan* the photosensitive elements 2030a and 2030b. On the other hand, the second optical scanning unit $2010_2$ *is employed to optically* scan the photosensitive elements 2030c and 2030d. Each of the optical scanning units $2010_1$ and $2010_2$ has the same configuration. For convenience of explanation, the direction corresponding to the main-scanning direction is referred to as the "main-scanning direction", and the direction corresponding to the sub-scanning direction is referred to as the "sub-scanning direction".

Figure 4A:
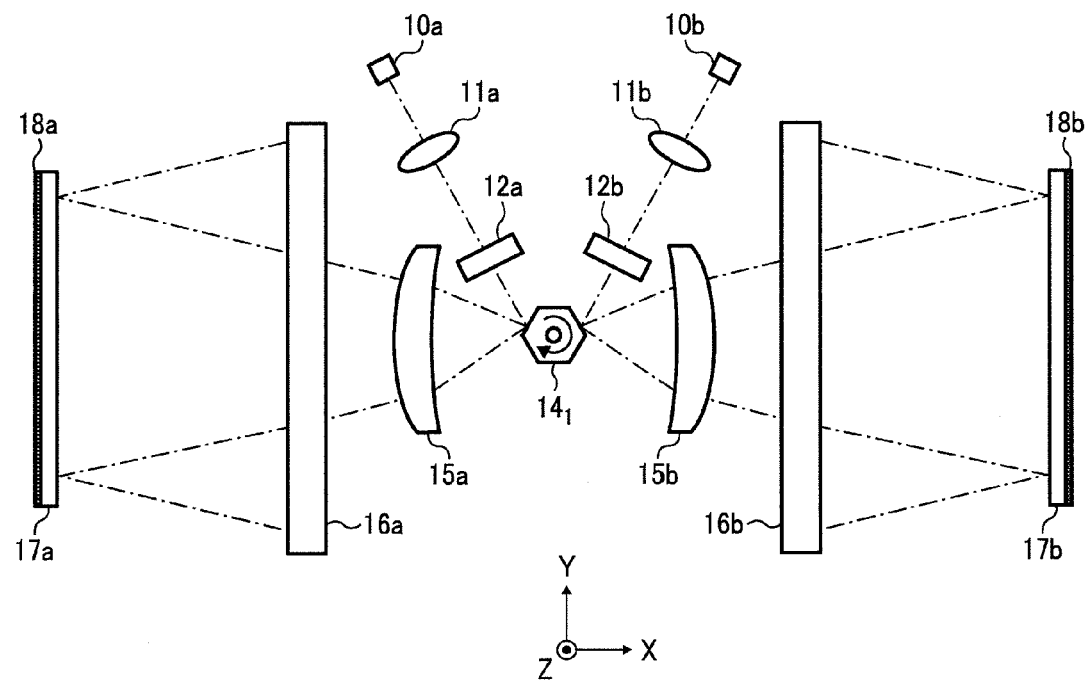
FIGS. 4A and 4B are schematic diagrams of an exemplary configuration of a first optical scanning unit illustrated in FIGS. 2 and 3.
Figure 4B:
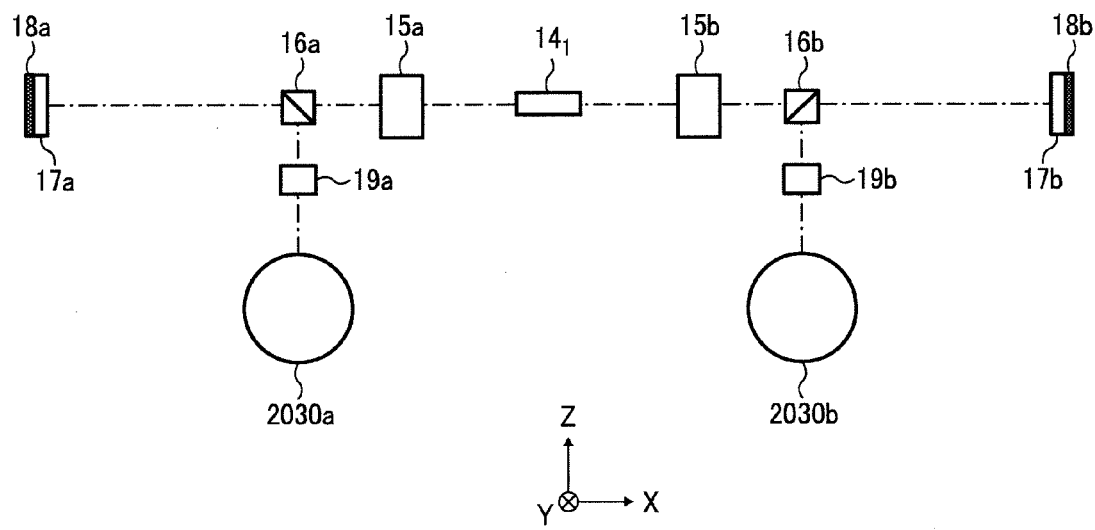

As shown in FIGS. 4A and 4B, the first optical scanning unit $2010_1$ includes two light sources 10a and 10b, two collimator lenses 11a and 11b, two cylindrical lenses 12a and 12b, a polygon mirror $14_1$, two fθ lenses 15a and 15b, two polarization beam splitters 16a and 16b, two quarter-wave plates 17a and 17b, two reflecting mirrors 18a and 18b, and two anamorphic lenses 19a and 19b.

Figure 5:
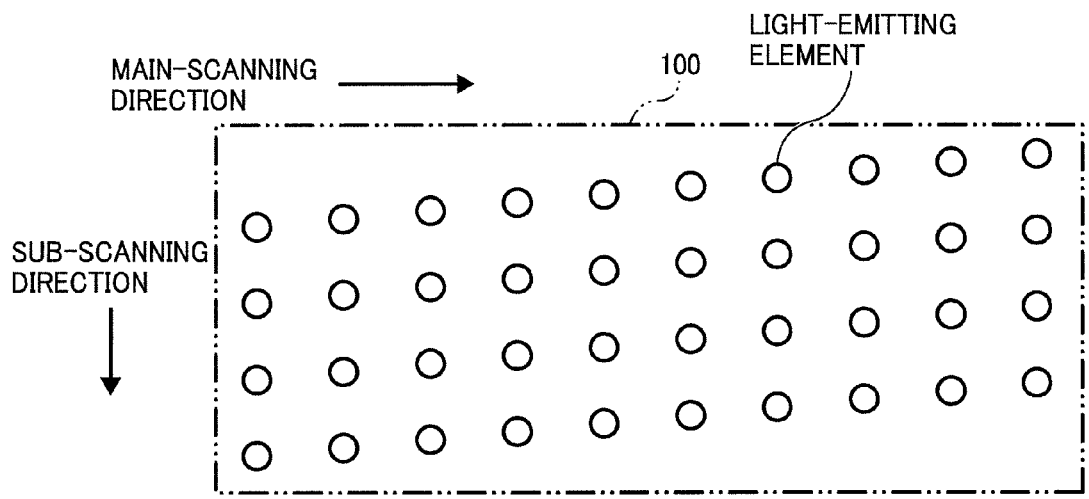
FIG. 5 is a plan view of a laser array.

As shown in FIG. 5, each of the light sources 10a and 10b includes a two-dimensional laser array 100 containing 40 light-emitting elements arranged on a single substrate on a plane including the main-scanning direction and the sub-scanning direction.

Each of the light-emitting elements is a vertical cavity surface emitting laser (VCSEL) with a wavelength band of 780 nanometers. In other words, the two-dimensional laser array 100 is an array including 40 VCSELs as light-emitting elements.

A light beam emitted from each of the light-emitting elements is in a P-polarized state. A P-polarized light beam is a polarized light having oscillation plane of polarization in the sub-scanning direction (Z-axis direction in FIG. 4).

Referring back to FIG. 4A, the collimator lens 11a substantially collimates the light beam emitted from the light source 10a. The cylindrical lens 12a receives the collimated light beam from the collimator lens 11a and focuses the collimated light beam onto a deflecting reflection surface of the polygon mirror $14_1$ in the Z-axis direction.

An optical system including the collimator lens 11a and the cylindrical lens 12a is a pre-polarizer optical system that guides the light beam emitted from the light source 10a toward the polygon mirror $14_1$. This pre-polarizer optical system corresponds to the pre-polarizer optical system for the K station.

The collimator lens 11b substantially collimates the light beam emitted from the light source 10b. The cylindrical lens 12b receives the collimated light beam from the collimator lens 11b and focuses the collimated light beam onto a deflecting reflection surface of the polygon mirror $14_1$ in the Z-axis direction.

The optical system constituting the collimator lens 11b and the cylindrical lens 12b is a pre-polarizer optical system that guides the light beam emitted from the light source 10b toward the polygon mirror $14_1$. This pre-polarizer optical system corresponds to the pre-polarizer optical system for the C station.

The polygon mirror $14_1$ is, for example a hexagonal mirror having six side-faces, each side face serving as a deflecting reflection surface. The polygon mirror $14_1$ deflects, at a constant angular speed, the light beam striking it from each of the cylindrical lenses 12a and 12b while rotating at a constant speed about an axis parallel to the Z-axis direction in a plane parallel to an XY plane. In the embodiment, the light beam from the cylindrical lens 12a is deflected toward the −X side of the polygon mirror $14_1$, and the light beam from the cylindrical lens 12b is deflected toward the +X side of the polygon mirror $14_1$. The light beam deflecting from the deflecting reflection surface of the polygon mirror $14_1$ forms a fan-shaped plane with a rotation of the polygon mirror $14_1$. The plane of the light beam formed in this way is called "deflection plane" (see Japanese Patent Application Laid-open No. H11-202252).

The fθ lens 15a is arranged at the −X side of the polygon mirror $14_1$ in an optical path of the light beam.

The polarization beam splitter 16a is arranged at the −X side of the fθ lens 15a in the optical path of the light beam. The polarization beam splitter 16a includes a polarization splitting film that transmits P-polarized light beam and reflects S-polarized light beam toward the −Z direction. In the embodiment, because the light beam passing through the fθ lens 15a is in the P-polarized state, the light beam passes through the polarization beam splitter 16a (see FIG. 6).

The quarter-wave plate 17a is arranged at the −X side of the polarization beam splitter 16a in the optical path of the light beam and shifts an optical phase of an incident light beam by a quarter wavelength. The light beam passing through the polarization beam splitter 16a becomes circularly polarized light and is output in the −X direction.

The reflecting mirror 18a is a planar mirror arranged at the −X side of the quarter-wave plate 17a and reflects the light beam passing through the quarter-wave plate 17a toward the +X direction. The light beam reflected from the reflecting mirror 18a re-enters the quarter-wave plate 17a. The light beam moving toward the quarter-wave plate 17a from the reflecting mirror 18a is circularly polarized light that rotates in the opposite direction with respect to the light beam moving toward the reflecting mirror 18a from the quarter-wave plate 17a.

The optical phase of the light beam that re-enters the quarter-wave plate 17a is shifted back by a quarter wavelength. As a result, the light beam becomes S-polarized light beam and enters the polarization beam splitter 16a.

In the embodiment, the optical path of the light beam moving from the polygon mirror $14_1$ toward the polarization beam splitter 16a, the optical path of the light beam moving from the polarization beam splitter 16a toward the quarter-wave plate 17a, the optical path of the light beam moving from the quarter-wave plate 17a toward the reflecting mirror 18a, the optical path of the light beam moving from the reflecting mirror 18a toward the quarter-wave plate 17a, and the optical path of the light beam moving from the quarter-wave plate 17a toward the polarization beam splitter 16a are present in the same plane, i.e., in the XY plane.

Figure 6:
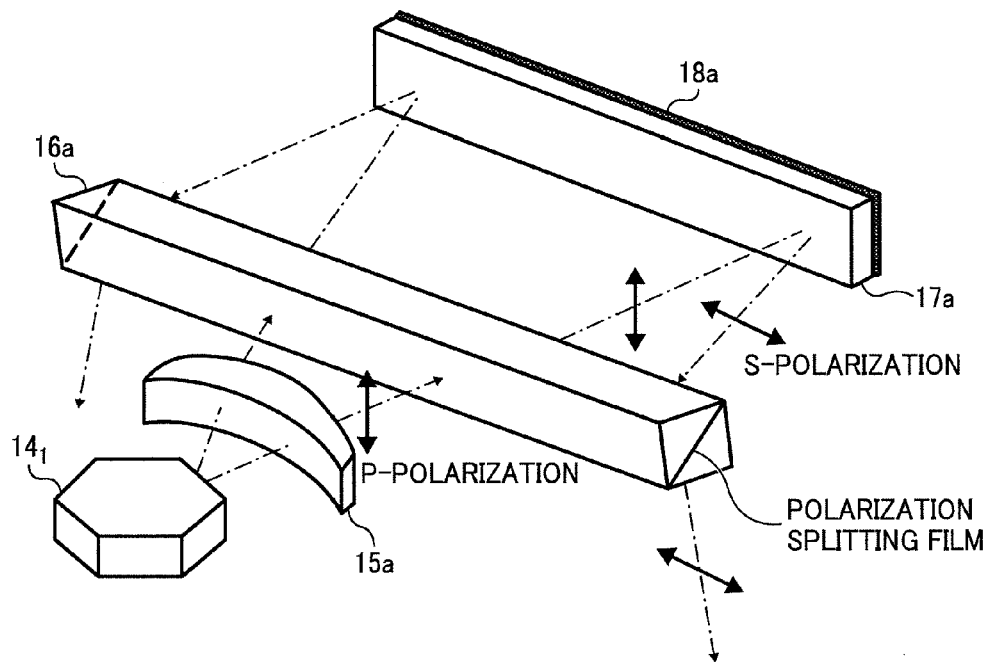
FIG. 6 is a perspective view depicting an arrangement of a deflector, a polarization beam splitter, a quarter-wave plate, and a reflecting mirror.

Because the light beam entering the polarization beam splitter 16a from the quarter-wave plate 17a is in S-polarized state, the light beam is reflected at the polarization beam splitter 16a toward the −Z direction (see FIG. 6).

The anamorphic lens 19a is arranged at the −Z side of the polarization beam splitter 16a in the optical path of the light beam that is reflected at the polarization beam splitter 16a in the −Z direction. The surface of the photosensitive element 2030a is irradiated with the light beam passing through the anamorphic lens 19a and a light spot is formed on the surface of the photosensitive element 2030a. The light spot moves in the longitudinal direction of the photosensitive element 2030a along with the rotation of the polygon mirror $14_1$, so that the surface of the photosensitive element 2030a is scanned. The direction of movement of the light spot on the surface of the photosensitive element 2030a corresponds to the "main-scanning direction", and the direction perpendicular to the "main-scanning direction" corresponds to the "sub-scanning direction".

The optical system including the fθ lens 15a, the polarization beam splitter 16a, the quarter-wave plate 17a, the reflecting mirror 18a, and the anamorphic lens 19a is a scanning optical system that focuses the light beam, from the cylindrical lens 12a, deflected by the polygon mirror $14_1$ onto the surface of the photosensitive element 2030a. This scanning optical system corresponds to the scanning optical system for the K station.

On the other hand, the fθ lens 15b is arranged at the +X side of the polygon mirror $14_1$ in the optical path of the light beam.

The polarization beam splitter 16b is arranged at the +X side of the fθ lens 15b in the optical path of the light beam. The polarization beam splitter 16b includes a polarization splitting film that transmits P-polarized light beam and reflects S-polarized light beam toward the −Z direction. In the embodiment, because the light beam passing through the fθ lens 15b is in the P-polarized state, the light beam passes through the polarization beam splitter 16b.

The quarter-wave plate 17b is arranged at the +X side of the polarization beam splitter 16b in the optical path of the light beam and shifts the optical phase of an incident light beam by a quarter wavelength. The light beam passing through the polarization beam splitter 16b becomes circularly polarized light and is output in the +X direction.

The reflecting mirror 18b is a planar mirror arranged at the +X side of the quarter-wave plate 17b and reflects the light beam passing through the quarter-wave plate 17b toward the −X direction. The light beam reflected from the reflecting mirror 18b re-enters the quarter-wave plate 17b. The light beam moving toward the quarter-wave plate 17b from the reflecting mirror 18b is circularly polarized light that rotates in the opposite direction with respect to the light beam moving toward the reflecting mirror 18b from the quarter-wave plate 17b.

The optical phase of the light beam that re-enters the quarter-wave plate 17b is shifted back by a quarter wavelength. As a result, the light beam becomes the S-polarized light beam and enters the polarization beam splitter 16b.

In the embodiment, the optical path of the light beam moving from the polygon mirror $14_1$ toward the polarization beam splitter 16b, the optical path of the light beam moving from the polarization beam splitter 16b toward the quarter-wave plate 17b, the optical path of the light beam moving from the quarter-wave plate 17b toward the reflecting mirror 18b, the optical path of the light beam moving from the reflecting mirror 18b toward the quarter-wave plate 17b, and the optical path of the light beam moving from the quarter-wave plate 17b toward the polarization beam splitter 16b are present in the same plane, i.e., in the XY plane.

Because the light beam entering the polarization beam splitter 16b from the quarter-wave plate 17b is in S-polarized state, the light beam is reflected at the polarization beam splitter 16b toward the −Z direction.

The anamorphic lens 19b is arranged at the −Z side of the polarization beam splitter 16b in the optical path of the light beam that is reflected at the polarization beam splitter 16b in the −Z direction. The surface of the photosensitive element 2030b is irradiated with the light beam via the anamorphic lens 19b and a light spot is formed thereon. The light spot moves in the longitudinal direction of the photosensitive element 2030b along with the rotation of the polygon mirror $14_1$, so that the surface of the photosensitive element 2030b is scanned. The direction of movement of the light spot on the surface of the photosensitive element 2030b corresponds to the "main-scanning direction", and the direction perpendicular to the "main-scanning direction" corresponds to the "sub-scanning direction".

The optical system including the fθ lens 15b, the polarization beam splitter 16b, the quarter-wave plate 17b, the reflecting mirror 18b, and the anamorphic lens 19b is a scanning optical system that focuses the light beam, from the cylindrical lens 12b, deflected by the polygon mirror $14_1$ onto the surface of the photosensitive element 2030b. This scanning optical system corresponds to the scanning optical system for the C station.

Figure 7A:
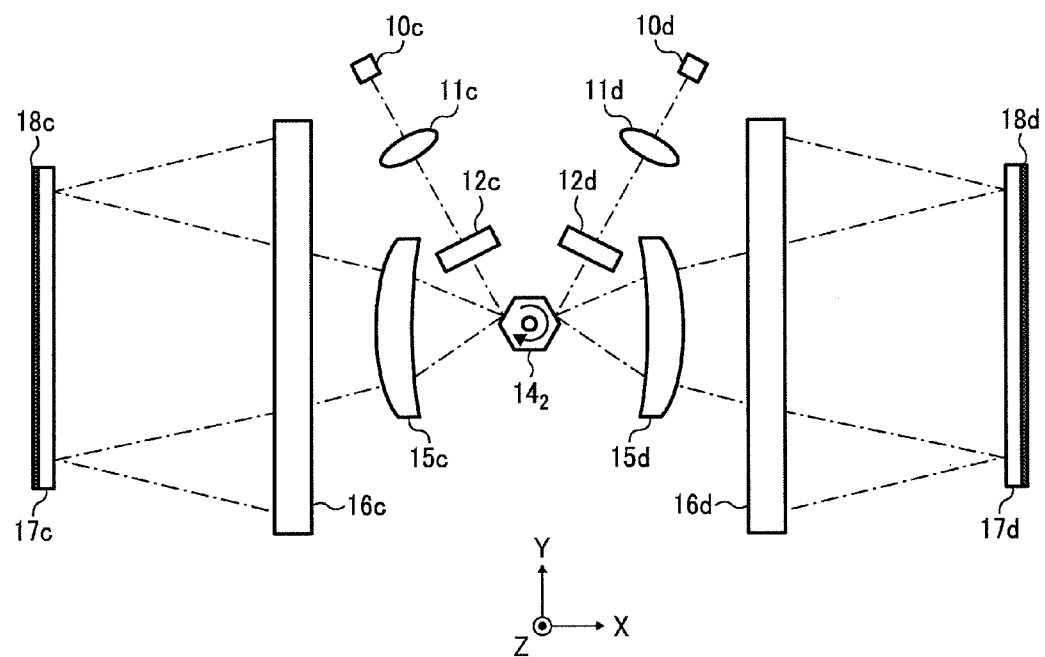
FIGS. 7A and 7B are a top view and a side view of a second optical scanning unit illustrated in FIGS. 2 and 3.
Figure 7B:
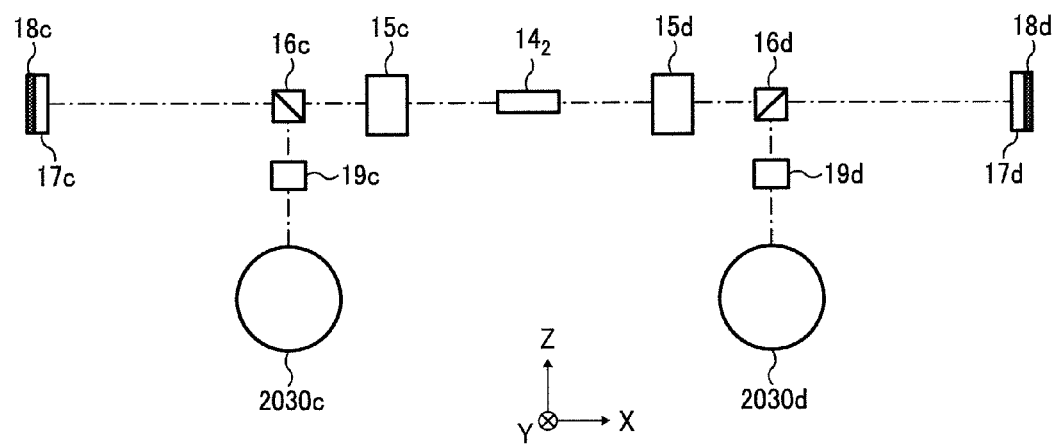

As shown in FIGS. 7A and 7B, the second optical scanning unit $2010_2$ includes two light sources 10c and 10d, two collimator lenses 11c and 11d, two cylindrical lenses 12c and 12d, a polygon mirror $14_2$, two fθ lenses 15c and 15d, two polarization beam splitters 16c and 16d, two quarter-wave plates 17c and 17d, two reflecting mirrors 18c and 18d, and two anamorphic lenses 19c and 19d.

The light sources 10c and 10d have the same configuration as the light source 10a and output P-polarized light beam.

The collimator lens 11c substantially collimates the light beam emitted from the light source 10c. The cylindrical lens 12c receives the collimated light beam and focuses the collimated light beam onto a deflecting reflection surface of the polygon mirror $14_2$ in the Z-axis direction.

The optical system including the collimator lens $11c$ and the cylindrical lens $12c$ is a pre-polarizer optical system that guides the light beam emitted from the light source $10c$ toward the polygon mirror $14_2$. This pre-polarizer optical system corresponds to the pre-polarizer optical system for the M station.

The collimator lens $11d$ substantially collimates the light beam emitted from the light source $10d$. The cylindrical lens $12d$ receives the collimated light beam from the collimator lens $11d$ and focuses the collimated light beam onto a deflecting reflection surface of the polygon mirror $14_2$ in the Z-axis direction.

The optical system including the collimator lens $11d$ and the cylindrical lens $12d$ is a pre-polarizer optical system that guides the light beam emitted from the light source $10d$ toward the polygon mirror $14_2$. The pre-polarizer optical system is the pre-polarizer optical system for the Y station.

The polygon mirror $14_2$ has the same configuration as the polygon mirror $14_1$; therefore its description will be omitted herefrom.

The fθ lens $15c$ is arranged at the −X side of the polygon mirror $14_2$ in the optical path of the light beam.

The polarization beam splitter $16c$ is arranged at the −X side of the fθ lens $15c$ in the optical path of the light beam. The polarization beam splitter $16c$ includes a polarization splitting film that transmits P-polarized light beam and reflects S-polarized light beam toward the −Z direction. In the embodiment, because the light beam passing through the fθ lens $15c$ is in P-polarized state, the light beam passes through the polarization beam splitter $16c$.

The quarter-wave plate $17c$ is arranged at the −X side of the polarization beam splitter $16c$ in the optical path of the light beam and shifts the optical phase of an incident light beam by a quarter wavelength. The light beam passing through the polarization beam splitter $16c$ becomes the circularly polarized light and is output in the −X direction.

The reflecting mirror $18c$ is a planar mirror arranged at the −X side of the quarter-wave plate $17c$ and reflects the light beam passing through the quarter-wave plate $17c$ toward the +X direction. The light beam reflected from the reflecting mirror $18c$ re-enters the quarter-wave plate $17c$. The light beam moving toward the quarter-wave plate $17c$ from the reflecting mirror $18c$ is circularly polarized light that rotates in the opposite direction with respect to the light beam moving toward the reflecting mirror $18c$ from the quarter-wave plate $17c$.

The optical phase of the light beam that re-enters the quarter-wave plate $17c$ is shifted back by a quarter wavelength. As a result, the light beam becomes S-polarized light beam and enters the polarization beam splitter $16c$.

In the embodiment, the optical path of the light beam moving from the polygon mirror $14_2$ toward the polarization beam splitter $16c$, the optical path of the light beam moving from the polarization beam splitter $16c$ toward the quarter-wave plate $17c$, the optical path of the light beam moving from the quarter-wave plate $17c$ toward the reflecting mirror $18c$, the optical path of the light beam moving from the reflecting mirror $18c$ toward the quarter-wave plate $17c$, and the optical path of the light beam moving from the quarter-wave plate $17c$ toward the polarization beam splitter $16c$ are present in the same plane, i.e., in the XY plane.

Because the light beam entering the polarization beam splitter $16c$ from the quarter-wave plate $17c$ is in S-polarized state, the light beam is reflected at the polarization beam splitter $16c$ toward the −Z direction.

The anamorphic lens $19c$ is arranged at the −Z side of the polarization beam splitter $16c$ in the optical path of the light beam that is reflected at the polarization beam splitter $16c$ in the −Z direction. The surface of the photosensitive element $2030c$ is irradiated with the light beam passing through the anamorphic lens $19c$ and a light spot is formed on the surface of the photosensitive element $2030c$. The light spot moves in the longitudinal direction of the photosensitive element $2030c$ along with the rotation of the polygon mirror $14_2$, so that the surface of the photosensitive element $2030c$ is scanned. The direction of movement of the light spot on the surface of the photosensitive element $2030c$ corresponds to the "main-scanning direction", and the direction perpendicular to the "main-scanning direction" corresponds to the "sub-scanning direction".

The optical system including the fθ lens $15c$, the polarization beam splitter $16c$, the quarter-wave plate $17c$, the reflecting mirror $18c$, and the anamorphic lens $19c$ is a scanning optical system that focuses the light beam, from the cylindrical lens $12c$, deflected by the polygon mirror $14_2$ onto the surface of the photosensitive element $2030c$. This scanning optical system corresponds to the scanning optical system for the M station.

On the other hand, the fθ lens $15d$ is arranged at the +X side of the polygon mirror $14_2$ in the optical path of the light beam.

The polarization beam splitter $16d$ is arranged at the +X side of the fθ lens $15d$ in the optical path of the light beam. The polarization beam splitter $16d$ includes a polarization splitting film that transmits P-polarized light beam and reflects S-polarized light beam toward the −Z direction. In the embodiment, because the light beam passing through the fθ lens $15d$ is in the P-polarized state, the light beam passing through the fθ lens $15d$ passes through the polarization beam splitter $16d$.

The quarter-wave plate $17d$ is arranged at the +X side of the polarization beam splitter $16d$ in the optical path of the light beam and shifts the optical phase of an incident light beam by a quarter wavelength. The light beam passing through the polarization beam splitter $16d$ becomes circularly polarized light and is output in the +X direction.

The reflecting mirror $18d$ is a planar mirror arranged at the +X side of the quarter-wave plate $17d$ and reflects the light beam passing through the quarter-wave plate $17d$ toward the −X direction. The light beam reflected from the reflecting mirror $18d$ re-enters the quarter-wave plate $17d$. The light beam moving toward the quarter-wave plate $17d$ from the reflecting mirror $18d$ is circularly polarized light that rotates in the opposite direction with respect to the light beam moving toward the reflecting mirror $18d$ from the quarter-wave plate $17d$.

The optical phase of the light beam that re-enters the quarter-wave plate $17d$ is shifted back by a quarter wavelength. As a result, the light beam becomes the S-polarized light beam and enters the polarization beam splitter $16d$.

In the embodiment, the optical path of the light beam moving from the polygon mirror $14_2$ toward the polarization beam splitter $16d$, the optical path of the light beam moving from the polarization beam splitter $16d$ toward the quarter-wave plate $17d$, the optical path of the light beam moving from the quarter-wave plate $17d$ toward the reflecting mirror $18d$, the optical path of the light beam moving from the reflecting mirror $18d$ toward the quarter-wave plate $17d$, and the optical path of the light beam moving from the quarter-wave plate $17d$ toward the polarization beam splitter $16d$ are present in the same plane, i.e., in the XY plane.

Because the light beam entering the polarization beam splitter $16d$ from the quarter-wave plate $17d$ is in S-polarized state, the light beam is reflected at the polarization beam splitter 16*d* toward the −Z direction.

The anamorphic lens 19*d* is arranged at the −Z side of the polarization beam splitter 16*d* in the optical path of the light beam that is reflected at the polarization beam splitter 16*d* in the −Z direction. The surface of the photosensitive element 2030*d* is irradiated with the light beam passing through the anamorphic lens 19*d* and a light spot is formed on the surface of the photosensitive element 2030*d*. The light spot moves in the longitudinal direction of the photosensitive element 2030*d* along with the rotation of the polygon mirror 14$_2$, so that the surface of the photosensitive element 2030*d* is scanned. The direction of movement of the light spot on the surface of the photosensitive element 2030*d* corresponds to the "main-scanning direction", and the direction perpendicular to the "main-scanning direction" corresponds to the "sub-scanning direction".

The optical system including the fθ lens 15*d*, the polarization beam splitter 16*d*, the quarter-wave plate 17*d*, the reflecting mirror 18*d*, and the anamorphic lens 19*d* is a scanning optical system that focuses the light beam, from the cylindrical lens 12*d*, deflected by the polygon mirror 14$_2$ onto the surface of the photosensitive element 2030*d*. This scanning optical system corresponds to the scanning optical system of the "Y station".

In the embodiment, the quarter-wave plate 17*a* and the reflecting mirror 18*a*, the quarter-wave plate 17*b* and the reflecting mirror 18*b*, the quarter-wave plate 17*c* and the reflecting mirror 18*c*, and the quarter-wave plate 17*d* and the reflecting mirror 18*d* are each integrally formed as one structure.

Figure 8:
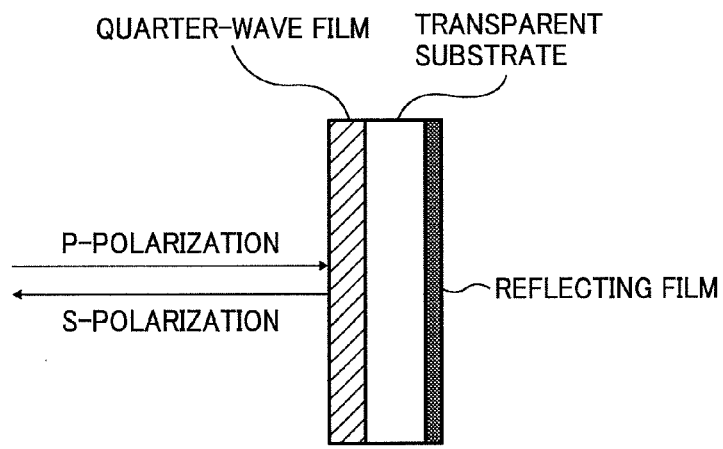
FIG. 8 is a schematic diagram for explaining the structure of the quarter-wave plate and the reflecting mirror as a single unit.

Specifically, for example, as shown in FIG. 8, such a structure includes a quarter-wave film arranged on one surface of a transparent substrate and a reflecting film arranged on the other surface of the transparent substrate. The quarter-wave film can be an oblique evaporation film made of an inorganic material, an organic stretched film, a polymer liquid crystal film, an anisotropic film with sub-wavelength grating structure, and a double refraction film, such as an anisotropic photonic crystal film. The reflecting film can be a metal film made of, for example, aluminum (Al) or silver (Ag), a multilayer made of a dielectric film, and a combination of the metal film and the dielectric film.

The polarization beam splitter 16 (i.e., 16*a*, 16*b*, 16*c*, and 16*d*) is a quadrangular prism elongated in the Y-axis direction with a square shape in XZ cross section. The polarization splitting film is inclined at angle of 45 degrees with respect to the XY plane. Accordingly, the surface of the bundle of rays of the deflected light beam that is reflected at the polarization beam splitter 16 and moves toward the photosensitive element 2030 is perpendicular to the XY plane.

Figure 9:
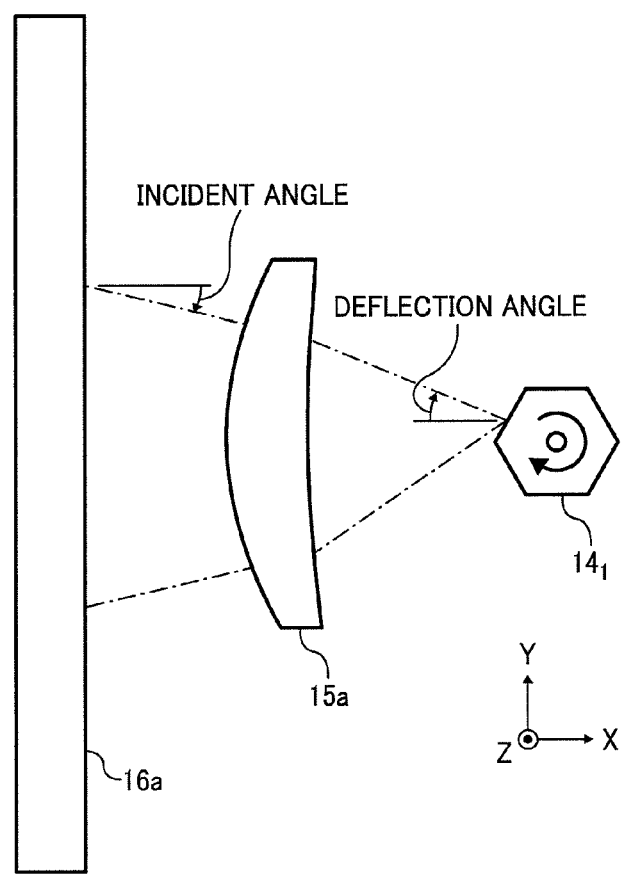
FIG. 9 is a schematic diagram for explaining a deflection angle and an incident angle.

A dielectric multilayer of, for example, inorganic oxide can be used for the polarization splitting film; however, if an incident angle of the light beam that is deflected by the polygon mirror 14 (i.e., 14$_1$ and 14$_2$) and enters the polarization beam splitter 16 via the fθ lens 15 (i.e., 15*a*, 15*b*, 15*c*, and 15*d*) is large (see FIG. 9), there is a possibility that splitting performance of the P-polarization and the S-polarization is degraded. A multilayered polarization splitting film formed of a combination of an organic anisotropic film and an organic isotropic film is preferable because it does not much degrade the splitting performance.

However, if the polarization splitting film of the polarization beam splitter 16 is inclined with respect to the XY plane, when the light beam passing through the fθ lens 15 enters the polarization beam splitter 16, the light beam enters in P-polarized state with respect to the polarization splitting film because when the deflection angle is equal to 0 degrees, the incident angle of the light beam becomes 0 degrees. In contrast, when the deflection angle is not equal to 0 degrees, the incident angle of the light beam does not become 0 degrees; therefore, the S-polarization occurs depending on the incident angle. This is an unavoidable phenomenon, in principle, caused by a polarization splitting surface that is inclined with respect to the XY plane.

Figure 10:
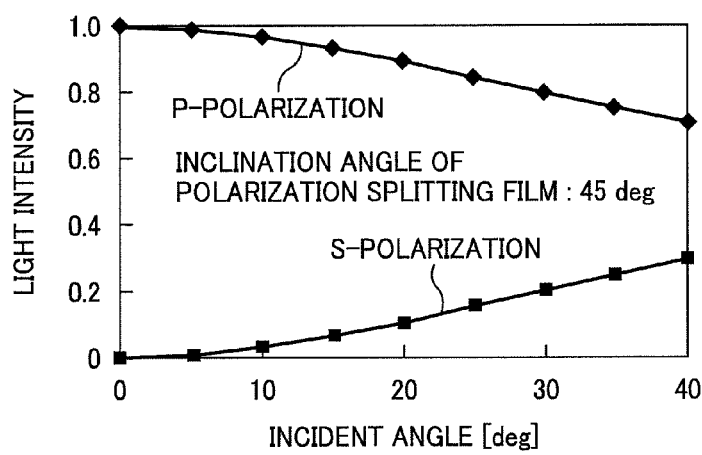
FIG. 10 is a graph for explaining a relation between the incident angle and light intensity of P-polarization and S-polarization.

FIG. 10 is a graph of a relation between the incident angle, and intensity of the P-polarization and the S-polarization when the light beam, via the fθ lens 15, enters the polarization beam splitter 16 in which the polarization splitting film is inclined at an angle of 45 degrees with respect to the XY plane. It is clear from the graph that as the incident angle becomes large, the P-polarization component decreases, whereas, the S-polarization component increases. The polarization splitting film transmits most of the P-polarization component of the incident light and reflects most of the S-polarization component of the incident light. Accordingly, the larger the incident angle, the smaller the P-polarization component, and the intensity of the light beam passing through the polarization beam splitter 16 is reduced. The vertical axis in FIG. 10 is normalized such that a sum of the intensity of the P-polarization and the S-polarization is set to 1. Because the polarization beam splitter 16 has no incident angle dependency on the S-polarization, most of the light beam with the S-polarization entering the polarization beam splitter 16, via the quarter-wave plate 17 and the reflecting mirror 18, is reflected toward the photosensitive element 2030.

Figure 11:
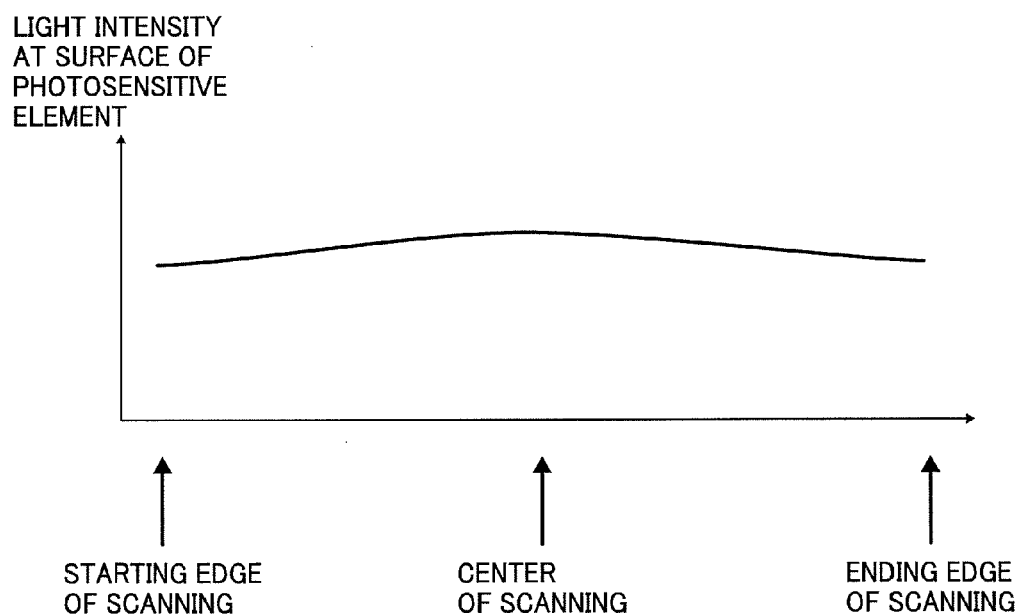
FIG. 11 is a graph for explaining shading.
Figure 12:
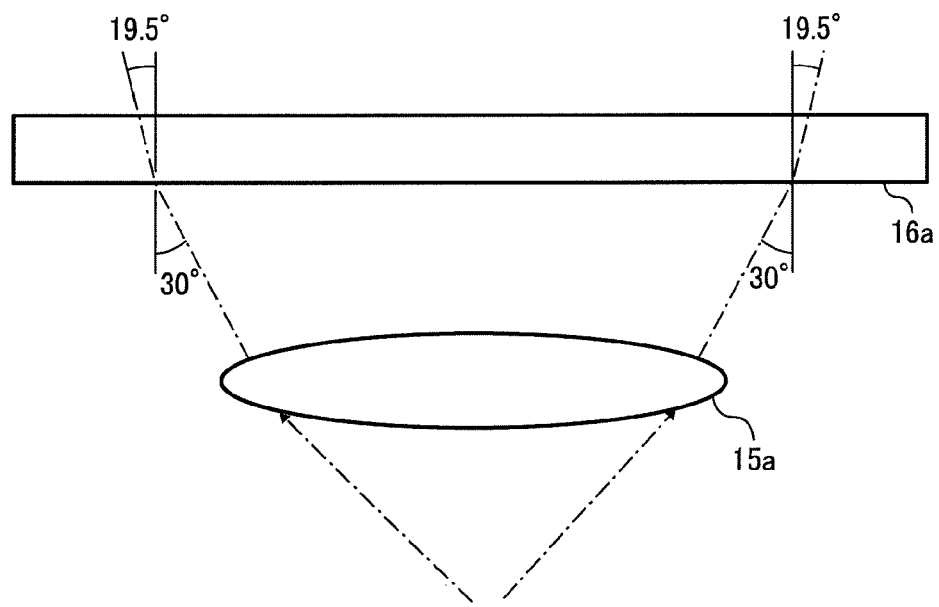
FIG. 12 is a schematic diagram for explaining the shading.

Accordingly, a transmittance of the light beam entering the polarization beam splitter 16 via the fθ lens 15 decreases depending on the incident angle. On the light spot formed on the surface of the photosensitive element 2030, shading occurs, i.e., the light intensity is high at the center of the scanning region (i.e., the center of the photosensitive element 2030 in the main-scanning direction) and gradually decreases toward a starting edge and an ending edge of the scanning region (the lateral sides of the photosensitive element 2030 in the main-scanning direction) (see FIG. 11). Specifically, for example, as shown FIG. 12, when the maximum incident angle is 30 degrees and when the refractive index of the polarization beam splitter 16 is 1.50, the incident angle of the light beam with respect to the polarization splitting film is 19.5 degrees. In this case, the P-polarization component is about 90% and the S-polarization component is about 10% as relative values. Accordingly, when optical scanning is performed in which the maximum incident angle of the light beam is 30 degrees with respect to the polarization beam splitter 16, at the starting edge and the ending edge of the scanning region, the shading decreases by 10% with respect to the center of the scanning region. The generated S-polarization component is reflected at the polarization splitting film in the +Z direction and moves outside of the optical path of the light beam to be scanned; therefore, no stray light adversely affecting scanning performance occurs.

Figure 13:
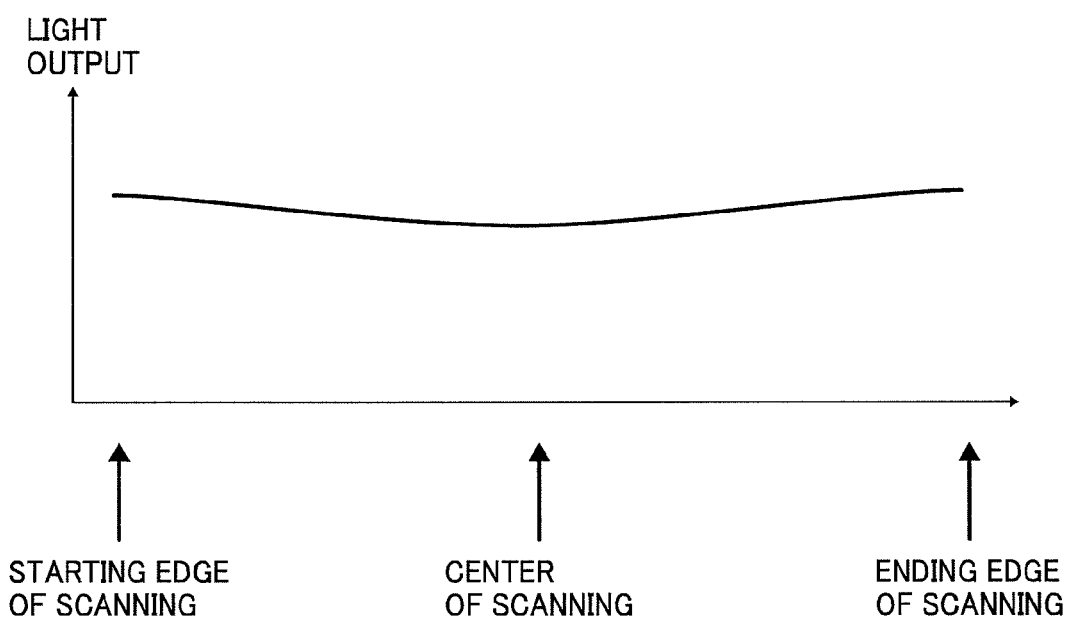
FIGS. 13 and 14 are graphs for explaining shading correction.
Figure 14:
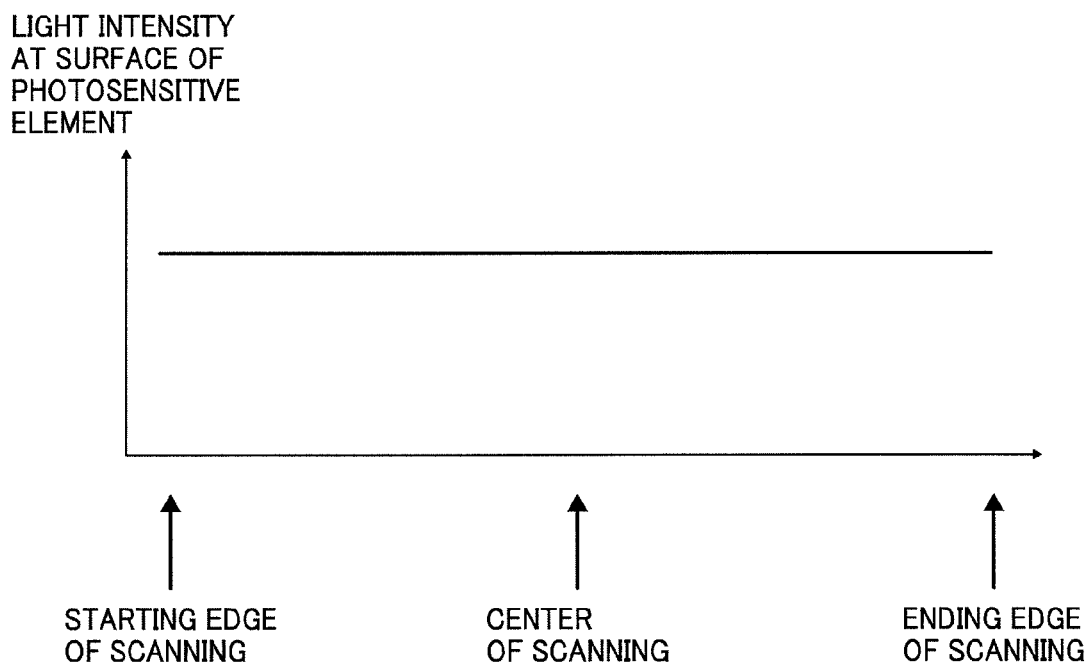

The scanning control device includes a light source control circuit (not shown) corresponding to each of the light sources 10*a* and 10*b*. The light source control circuit adjusts driving current (light output) of the corresponding light source 10 (i.e., 10*a* and 10*b*) according to an expected shading (see FIG. 13) and controls such that the uniform light intensity can be obtained over the entire scanning region (see FIG. 14). Specifically, the relation between the deflection angle and the shading at the polygon mirror 14 is obtained beforehand, and the light source control circuit adjusts the driving current of the polygon mirror 14 according to the deflection angle by referring to that relation when scanning is actually performed.

As described above, in the optical scanning device 2010, the polarization beam splitter 16 serves as a polarization splitting element and the quarter-wave plate 17 serves as a phase shifting member. In addition, the light source 10 (i.e., 10a, 10b, 10c, and 10d), the collimator lens 11 (i.e., 11a, 11b, 11c, and 11d), and the light source control circuit constitute a light source unit.

The optical scanning device 2010 includes two optical scanning units $2010_1$ and $2010_2$, and each of the optical scanning units $2010_1$ and $2010_2$ includes two light sources 10, two pre-polarizer optical systems, a polygon mirror 14, and two scanning optical system.

Each of the optical systems includes the fθ lens 15, the polarization beam splitter 16, the quarter-wave plate 17, the reflecting mirror 18, and the anamorphic lens 19.

The light beam passing through the fθ lens 15 passes through the polarization beam splitter 16, is converted into S-polarized light beam by the quarter-wave plate 17 and the reflecting mirror 18, re-enters the polarization beam splitter 16, is reflected at the polarization beam splitter 16 in the −Z direction, and is focused on the surface of the photosensitive element 2030.

The optical path of the light beam moving from the polygon mirror 14 toward the fθ lens 15, the optical path of the light beam moving from the fθ lens 15 toward the polarization beam splitter 16, the optical path of the light beam moving from the polarization beam splitter 16 toward the quarter-wave plate 17, the optical path of the light beam moving from the quarter-wave plate 17 toward the reflecting mirror 18, the optical path of the light beam moving from the reflecting mirror 18 toward the quarter-wave plate 17, and the optical path of the light beam moving from the quarter-wave plate 17 toward the polarization beam splitter 16 are present in the same plane. Accordingly, the optical path from the polygon mirror to immediately before the photosensitive element 2030 is folded in the same plane without being deflected in the Z-axis direction; therefore, it is possible to implement a thinner optical scanning device.

A recursive optical system, which is formed of the polarization beam splitter 16, the quarter-wave plate 17, and the reflecting mirror 18, is used at positions where the optical path is folded and branched off to the photosensitive element 2030. Accordingly, almost no loss of the light level occurs, thus the light beam from the light source can be effectively used. This makes it possible to avoid using an expensive light source with high output performance.

The prism-shaped polarization beam splitter 16 in a shape of a parallel plate with a light-incident surface being perpendicular to the XY plane is used for the polarization splitting element. Accordingly, a scanning line is not bent due to the polarization splitting element, which makes it possible to perform precise optical scanning.

Because the light source control circuit of the scanning control device adjusts the driving current (light output) of the light sources according to the shading expected in advance, it is possible to prevent a decrease in scanning quality.

Reflective optical elements need to be machined very precisely; because, the effect of the surface quality of the reflective optical elements, i.e., the reflecting mirrors 18 in this case, is generally twice as much as that of transmissive optical elements. In the embodiment, the planar mirrors that can be produced by precisely polishing in an easy-to-process manner are used as the reflective optical element; therefore, manufacturing costs can be reduced.

Because the color printer 2000 according to the embodiment includes the optical scanning device 2010, a gap between the optical scanning device 2010 and each of the photosensitive elements 2030 can be small. As a result, the optical scanning device can be made thinner without increasing costs.

Figure 15:
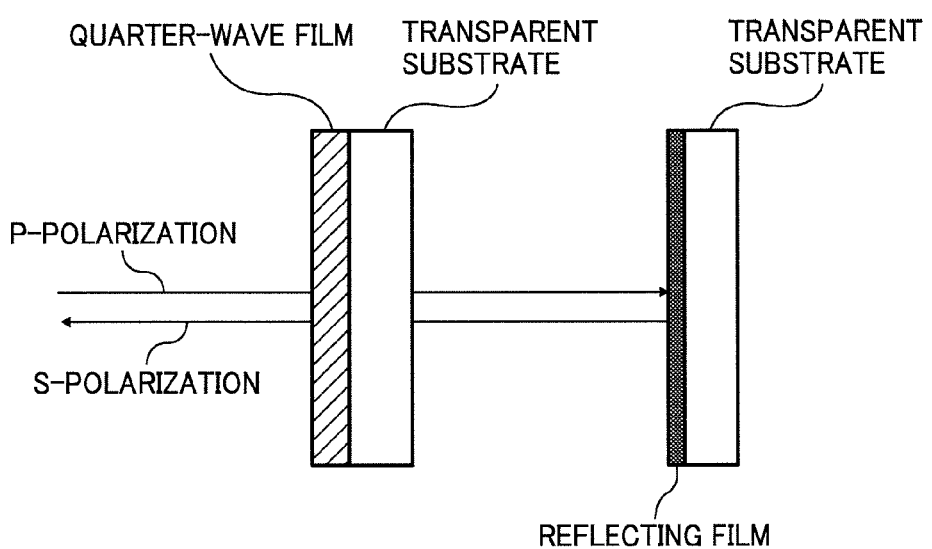
FIGS. 15 and 16 are schematic diagrams for explaining other embodiments of a quarter-wave plate and a reflecting mirror.

The quarter-wave plate 17 and the reflecting mirror 18 can be arranged separately instead of being arranged as one integrated unit. For example, as shown in FIG. 15, it is possible to use an optical member, in which a quarter-wave film is formed on one surface of a transparent substrate, for the quarter-wave plate 17 and an optical member, in which a reflecting film is formed on one surface of a transparent substrate, for the reflecting mirror 18.

Figure 16:
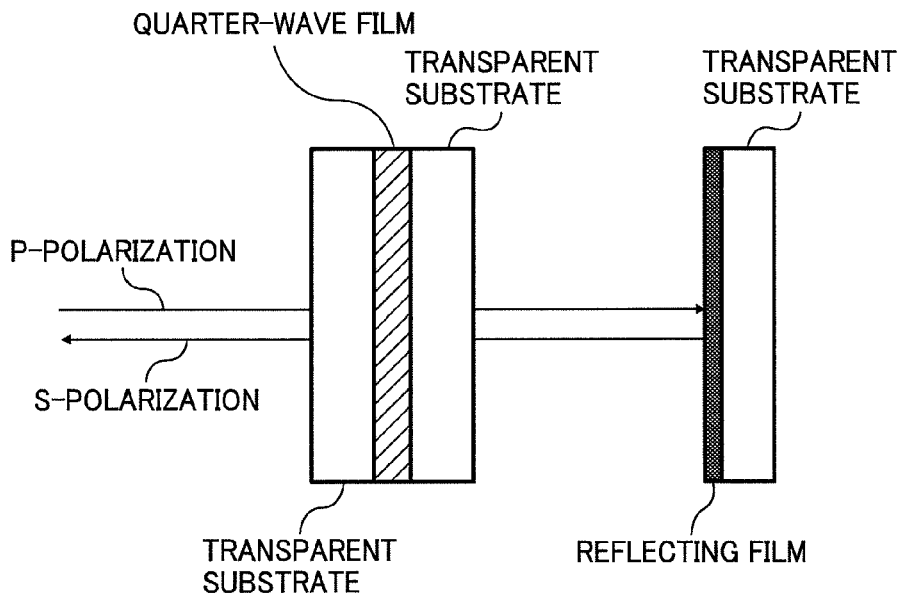

As shown in FIG. 16 as an example, it is also possible to use an optical member, in which the quarter-wave film is arranged between two transparent substrates, for the quarter-wave plate 17. This makes it possible to prevent an increase in wavefront aberration of transmitted light when an organic film, such as the organic stretched film or the polymer liquid crystal film, is used for the quarter-wave film. In FIG. 16, one surface or both surfaces of the quarter-wave film are bonded to the transparent substrate with an adhesive. The adhesive used at this time preferably has a refractive index close to an average refractive index of the quarter-wave film.

Figure 17:
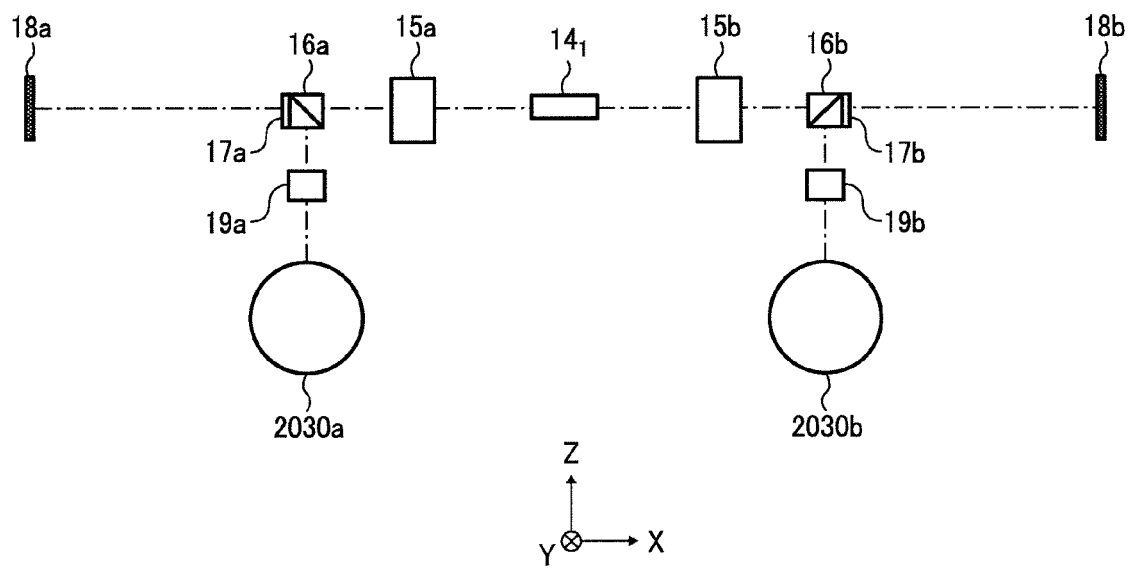
FIG. 17 is a schematic diagram for explaining the structure of the quarter-wave plate and a polarization beam splitter as a single unit.

As shown in FIG. 17 as an example, the quarter-wave plate 17 and the polarization beam splitter 16 can be arranged as one integrated unit.

In the embodiment, a single fθ lens 15 is used for each of the scanning optical systems; however, the configuration is not limited thereto. For example, two sets of two fθ lenses 15 can be used.

In each of the scanning optical systems, the scanning lens includes a single fθ lens 15 and a single anamorphic lens 19; however, the configuration is not limited thereto. For example, the scanning lens can include a single anamorphic fθ lens and a single long-cylindrical lens.

The quarter-wave plate 17 is used for converting a polarization state; however, the configuration is not limited thereto. For example, an optical member that shifts an optical phase of an incident light by $\{(m/2)\pm(\frac{1}{4})\}\lambda$ (where, $\lambda$ is a light wavelength, and m is an integer equal to or larger than 0) can be used.

Figure 18:
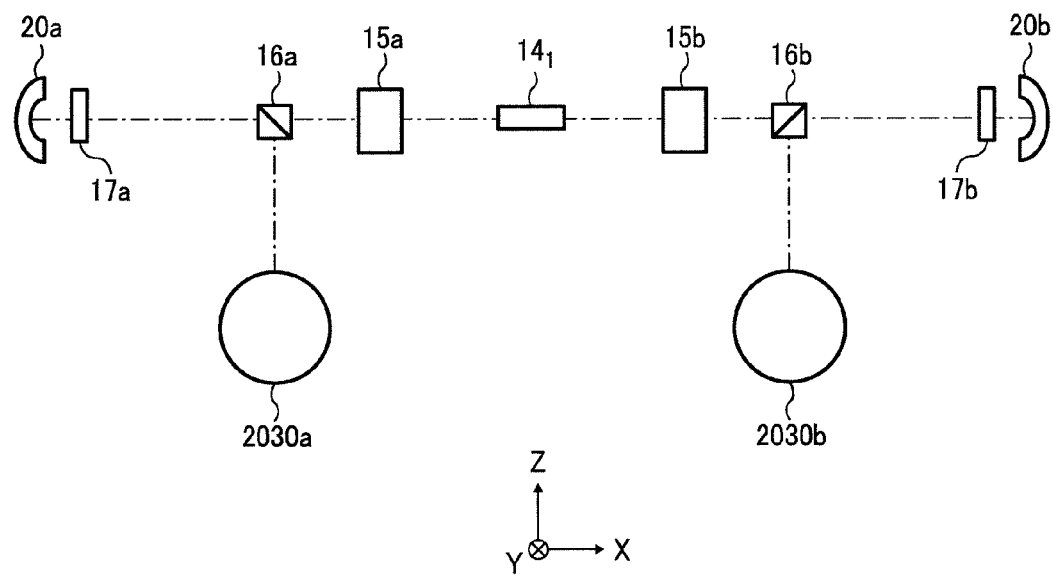
FIGS. 18 to 21 are schematic diagrams for explaining other embodiments of a scanning optical system.

As shown in FIG. 18 as an example, anamorphic reflective image forming elements 20a and 20b having a "focusing function" and a "constant-speed scanning function" (hereinafter, "anamorphic fθ mirror") can be used, instead of the fθ lens 15, the anamorphic lens 19, and the reflecting mirror 18. With the "focusing function", uniform focusing spots are formed on the surface of the photosensitive element 2030 while optical face tangle error correction of the polygon mirror is performed. With the "constant-speed scanning function", the surface of the photosensitive element 2030 is optically scanned at a constant speed in the main-scanning direction with the light beam deflected at a constant speed by the polygon mirror 14.

By using the anamorphic fθ mirrors, it is possible to perform the "focusing function" and the "constant-speed scanning function" with a single optical element, which effectively simplifies the configuration by eliminating the number of units and reduces costs. Because the fθ lens 15 need not be arranged between the polygon mirror 14 and the polarization beam splitter 16, a gap between the polygon mirror 14 and the polarization beam splitter 16 can be set as desired. As a result, gaps between the neighboring photosensitive elements 2030 can be freely set; therefore, it is possible to implement a downsized thinner image forming apparatus with narrower gaps between each of the photosensitive elements 2030.

The bundle of rays entering the anamorphic fθ mirror is in a main-scanning plane including optical axis of the mirror;

therefore, the rays are incident parallel to the optical axis of the mirror and is not obliquely incident with respect to the optical axis in the sub-scanning direction. Accordingly, a scanning line of the anamorphic fθ mirror is scarcely bent, which makes it possible to implement precise optical scanning.

Figure 19:
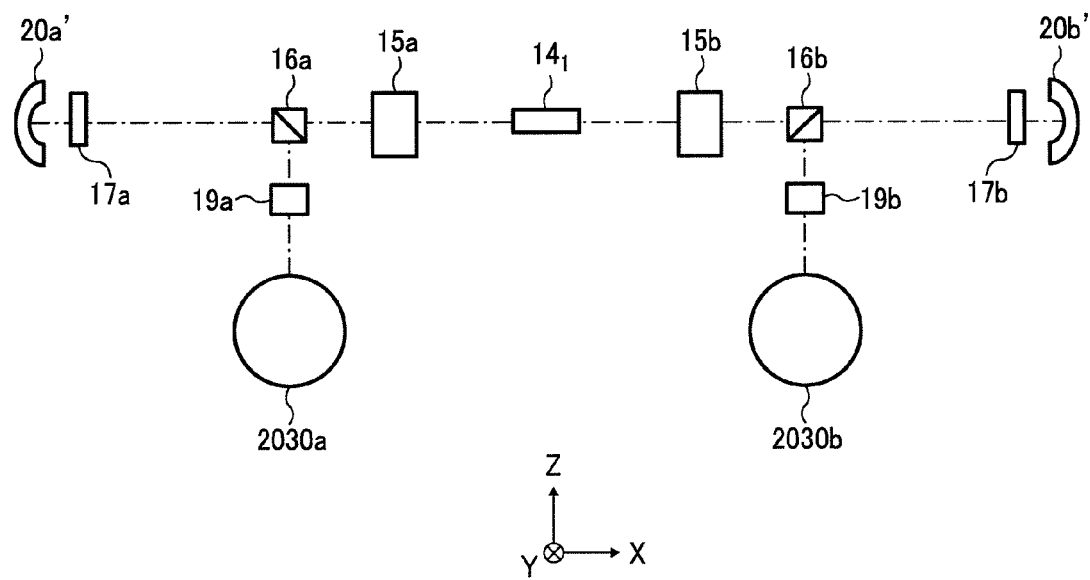

As shown in FIG. 19 as an example, instead of the fθ lens 15 and the reflecting mirror 18, anamorphic fθ mirrors 20a' and 20b' can be used. In this configuration, the anamorphic fθ mirrors 20a' and 20b' have the "constant-speed scanning function", and both of the anamorphic fθ mirrors 20a' and 20b' and the anamorphic lenses 19a and 19b cooperatively serve "focusing function".

Figure 20:
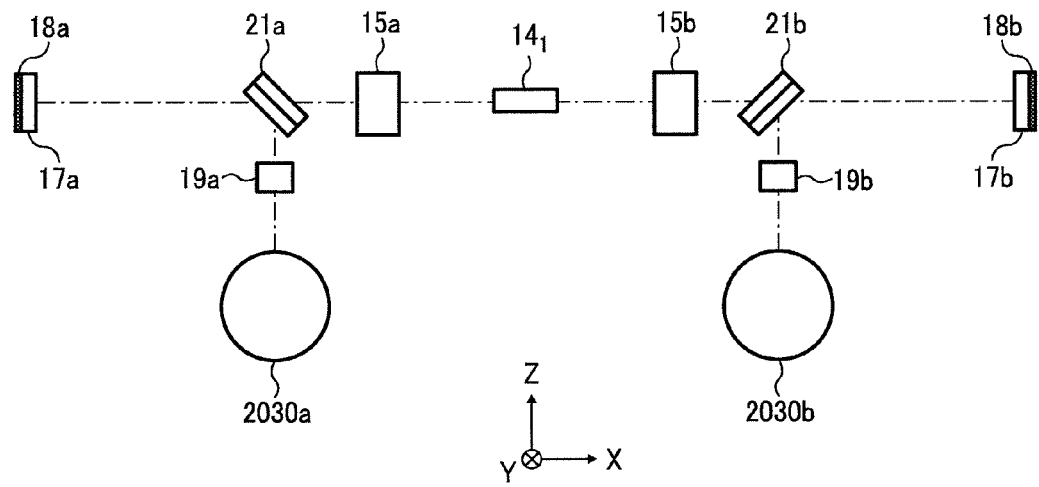

As shown in FIG. 20 as an example, instead of the polarization beam splitter 16, it is possible to use polarization splitting elements 21a and 21b in each of which the polarization splitting film is arranged between transparent parallel plates, which allows a reduction in cost. The polarization splitting film can be configured such that the polarization splitting film is formed on one surface of a single transparent parallel plate.

In the above explanation, it has been mentioned that the polarization splitting film of the polarization beam splitter 16 is inclined at an angle of 45 degrees with respect to the XY plane; however, the configuration is not limited thereto. For example, the polarization splitting film can be inclined at any angle between 30 degrees and 60 degrees with respect to the XY plane. In such a case, the polarization splitting film having an optimum splitting property of the P-polarization and the S-polarization at an arbitrary angle is used.

Figure 21:
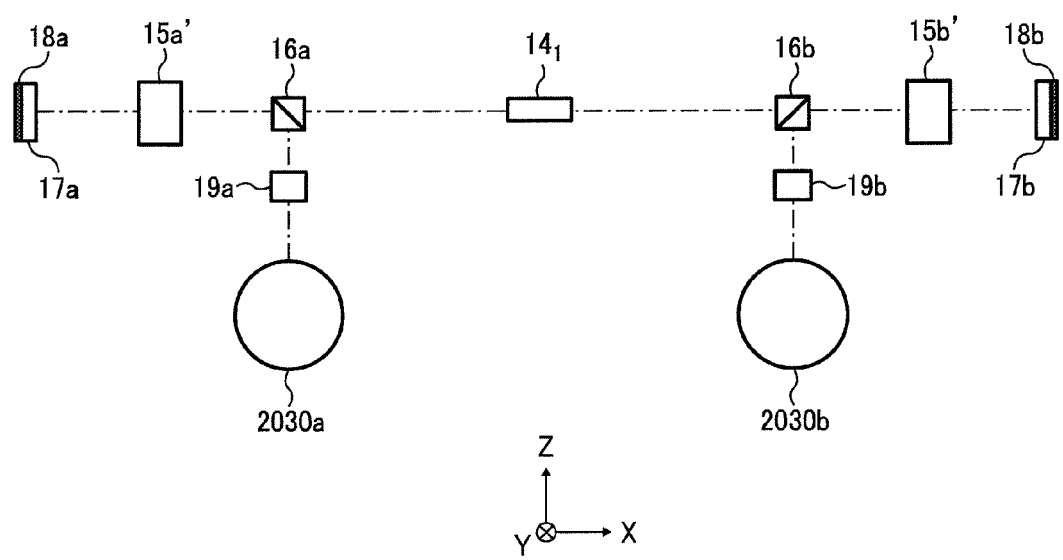

As shown in FIG. 21 as an example, the scanning lenses (15a' and 15b') can be arranged between the polarization beam splitter 16 and the reflecting mirror 18.

A surface at the polarization beam splitter 16 side of the scanning lens 15 (hereinafter, "surface A") and a surface at the reflecting mirror 18 side of the scanning lens 15 (hereinafter "surface B") are special toroidal surfaces. The special toroidal surfaces have a property in which a curvature in the sub-scanning direction (Z-axis direction in this example) varies according to a height of the lens in the main-scanning direction (Y-axis direction in this example). The curvature in the sub-scanning direction is given by Equations (1) and (2) below when Cm=1/Ry:

$$x(y, z) = \frac{y^2 \cdot C_m}{1 + \sqrt{1 - (1 + K) \cdot (y \cdot C_m)^2}} + A_4 \cdot y^4 + A_6 \cdot y^6 + \quad (1)$$

$$A_8 \cdot y^8 + A_{10} \cdot y^{10} + A_{12} \cdot y^{12} + \frac{Cs(y) \cdot z^2}{1 + \sqrt{1 - (Cs(y) \cdot z)^2}}$$

$$Cs(y) = \frac{1}{R_z} + B_1 \cdot y + B_2 \cdot y^2 + B_3 \cdot y^3 + B_4 \cdot y^4 + B_5 \cdot y^5 + B_6 \cdot y^6 \ldots \quad (2)$$

where, x is a depth in the optical axis direction, y is a distance away from the optical axis in the main-scanning direction, z is a distance away from the optical axis in the sub-scanning direction, K is a constant of the cone, A4, A6, A8, A10, A12, B1 to B8 are coefficients.

Both surfaces (surface A and surface B) of the scanning lens 15 are rotational-symmetrical aspheric surfaces. The aspheric surface used for the scanning lens 15 can be given by Equation (3) below:

$$x(H) = \frac{CH^2}{1 + \sqrt{1 - (1 + K) \cdot C^2 H^2}} + \quad (3)$$

$$A_4 \cdot H^4 + A_6 \cdot H^6 + A_8 \cdot H^8 + A_{10} \cdot H^{10}$$

where, C is a reciprocal of a paraxial curvature radius (paraxial curvature), H is a height from the optical axis.

Values at both surfaces (surfaces A and B) of the scanning lens 15 are shown in table in FIG. 22.

Because both surfaces of the scanning lens 15 are formed in this manner, it is possible to easily reduce a spot diameter of the laser beam and implement a constant-speed performance of a scanning laser beam.

The cross-sectional shape orthogonal to the main-scanning direction of the scanning lens 15 is an arc shape that is a simple shape. This allows easy detection and speedy evaluation in a short time compared in a case when a lens having a free-form surface (a non-arc shape in cross section orthogonal to the main-scanning direction) is used. Furthermore, an advantage is afforded in that the scanning lens 15 used in the embodiment can be easily produced.

Because the light beam reciprocates between the polarization beam splitter 16 and the reflecting mirror 18, the light beam passes through the scanning lens 15 twice. Accordingly, the effect of aberration correction that the scanning lens 15 has can be improved.

As described above, because the scanning lens 15 has a plurality of optical surfaces and is designed in a flexible manner, high image quality can be produced by arranging the scanning lens 15 between the polarization beam splitter 16 and the reflecting mirror 18.

In the above explanation, the optical phase of the light beam is controlled to be shifted using the quarter-wave plate 17. However, because an incident angle on the quarter-wave plate 17 arranged in the scanning optical system varies, the polarization direction of the light beam that passes through the quarter-wave plate 17 twice is not always linear polarization that is parallel to the longitudinal direction of the polarization beam splitter 16. Accordingly, components that pass through the polarization beam splitter 16 occur. When the light beam that passed through the polarization beam splitter 16 re-enters the polygon mirror 14, an unintended portion on the surface of the photosensitive element 2030 is accidentally exposed. Therefore, the thickness of the quarter-wave plate 17 is optimized with respect to the center of the scanning portion, and shielding members are preferably arranged at the starting edge and the ending edge of the scanning region. With this configuration, when the polygon mirror 14 is used as a deflector, the shielding members can be served as a convection controller. However, the configuration is not limited thereto. For example, an optical housing in which a protrusion is arranged can, of course, be used as the shielding member instead of arranging the shielding members.

In the above explanation, it has been mentioned that the number of the light-emitting element in the two-dimensional laser array 100 is 40; however, the number of the light-emitting element in the two-dimensional laser array 100 is not limited to 40.

Each of the light sources 10 can include a VCSEL with a single light-emitting element, instead of the two-dimensional laser array 100.

Alternatively, each of the light sources 10 can include one or plurality of edge emitting semiconductor lasers, instead of the two-dimensional laser array 100.

In the above explanation, it has been mentioned that the color printer 2000 serving as the image forming apparatus includes four photosensitive elements 2030; however, the configuration is not limited thereto. For example, the color printer 2000 can include only two photosensitive elements 2030, or even a single photosensitive element 2030.

According to an aspect of the present invention, an optical scanning device and an image forming apparatus with a thinner structure can be implemented without increasing costs.

At least one optical scanning device according to the present invention is arranged, which allows a smaller structure than ever before.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans a target surface with a light beam, the scanning device comprising:
    a light source unit that outputs a light beam;
    a deflector that receives the light beam from the light source unit and deflects the light beam; and
    a scanning optical system that focuses the light beam deflected by the deflector on the target surface,
    wherein the scanning optical system includes a polarization splitting element, a reflective optical element, and a conversion optical system,
    the polarization splitting element receives the light beam from the deflector and, when the light beam is polarized in a first-polarized state, transmits the light beam,
    the conversion optical system is arranged in an optical path of the light beam that is in the first-polarized state and passes through the polarization splitting element, receives the light beam from the polarization splitting element, and converts the light beam in the first-polarized state to a second-polarized state,
    the reflective optical element receives the light beam in the second-polarized state from the conversion optical system, converts the light beam in the second-polarized state to a third-polarized state, and reflects the light beam in the third-polarized state toward the conversion optical system,
    the conversion optical system converts the light beam in the third-polarized state that is reflected by the reflective optical element to a fourth-polarized state and outputs the light beam toward the polarization splitting element,
    the polarization splitting element receives the light beam in the fourth-polarized state from the conversion optical system and deflects the optical path of the light beam in the fourth-polarized state into a direction toward the target surface, and
    wherein the scanning optical system includes a transmissive-type image-forming optical element, the transmissive-type image-forming optical element being arranged between the polarization splitting element and the reflective optical element, and both the light beam moving from the polarization splitting element toward the reflective optical element and the light beam moving from the reflective optical element toward the polarization splitting element pass through the transmissive-type image-forming optical element.

2. The optical scanning device according to claim 1, wherein the optical path of the light beam moving from the polarization splitting element toward the reflective optical element and the optical path of the light beam moving from the reflective optical element toward the polarization splitting element are in same plane.

3. The optical scanning device according to claim 2, wherein the optical path of the light beam moving from the polarization splitting element toward the reflective optical element and the optical path of the light beam moving from the reflective optical element toward the polarization splitting element are in a plane including a deflection plane corresponding to a plane of the light beam that is formed over time by the light beam being deflected at a deflecting reflection surface of the deflector.

4. The optical scanning device according to claim 1, wherein the conversion optical system includes a phase shifting member that is arranged in the optical path between the reflective optical element and the polarization splitting element and shifts an optical phase of an incident light by $\{(m/2)\pm 1/4\}\lambda$, where $\lambda$ is a light wavelength and m is an integer equal to or larger than 0.

5. The optical scanning device according to claim 4, wherein the optical path of the light beam moving from the polarization splitting element toward the phase shifting member, the optical path of the light beam moving from the phase shifting member toward the reflective optical element, the optical path of the light beam moving from the reflective optical element toward the phase shifting member, and the optical path of the light beam moving from the phase shifting member toward the polarization splitting element are in same plane.

6. The optical scanning device according to claim 5, wherein the optical path of the light beam moving from the polarization splitting element toward the phase shifting member, the optical path of the light beam moving from the phase shifting member toward the reflective optical element, the optical path of the light beam moving from the reflective optical element toward the phase shifting member, and the optical path of the light beam moving from the phase shifting member toward the polarization splitting element are in the plane including the deflection plane corresponding to the plane of the light beam that is formed over time by the light beam being deflected at the deflecting reflection surface of the deflector.

7. The optical scanning device according to claim 1, wherein the reflective optical element is a planar mirror.

8. The optical scanning device according to claim 1, wherein the polarization splitting element is a polarization beam splitter.

9. The optical scanning device according to claim 1, wherein the light source unit is configured to output a light beam having an intensity corresponding to a deflection angle at the deflector.

10. The optical scanning device according to claim 1, wherein the light source unit outputs a light beam that is polarized in the first-polarization direction.

11. The optical scanning device according to claim 1, wherein each of the light emitting units is a vertical cavity surface emitting laser that emits light with a wavelength band of 780 nanometers.

12. The optical scanning device according to claim 1, wherein the light source unit includes an array of light-emitting elements, the light-emitting elements being spaced apart from each other in a direction that is perpendicular to an output direction of the light beam.

13. An image forming apparatus comprising: at least one image carrier; and the optical scanning device of claim 7, configured to scan a surface of the image carrier with a light beam containing image information, and wherein the light source unit is configured to output a light beam having an intensity corresponding to a deflection angle at the deflector.

14. The image forming apparatus according to claim 13, wherein the image information is multi-color image information.

* * * * *